(12) United States Patent
Hilt et al.

(10) Patent No.: US 6,328,099 B1
(45) Date of Patent: Dec. 11, 2001

(54) MOVING BED DRYER

(75) Inventors: George Allen Hilt, Yazoo City; Donald Ray Thomas, Jackson, both of MS (US)

(73) Assignee: Mississippi Chemical Corporation, Yazoo City, MS (US)

(*) Notice: Subject to any disclaimer, the term of this patent is extended or adjusted under 35 U.S.C. 154(b) by 0 days.

(21) Appl. No.: 09/295,413

(22) Filed: Apr. 21, 1999

(51) Int. Cl.[7] ........................................................ F28F 3/00
(52) U.S. Cl. ................... 165/166; 165/DIG. 222; 34/167; 34/372; 34/373; 34/374; 34/474
(58) Field of Search ...................... 165/166, DIG. 222; 34/165, 167, 372, 373, 374, 474

(56) References Cited

U.S. PATENT DOCUMENTS

| | | | |
|---|---|---|---|
| 3,092,472 | * 6/1963 | Figley | .............................. 64/167 |
| 3,181,488 | 5/1965 | Roe et al. | . |
| 3,397,460 | * 8/1968 | Hall | .................................... 165/166 |
| 4,141,155 | * 2/1979 | Benzon | ............................. 34/167 X |
| 4,424,634 | * 1/1984 | Westelaken | ............................ 34/167 |
| 5,167,274 | 12/1992 | Mueller | . |

* cited by examiner

Primary Examiner—Christopher Atkinson
(74) Attorney, Agent, or Firm—Oblon, Spivak, McClelland, Maier & Neustadt, P.C.

(57) ABSTRACT

Free-flowing solid particles are dried in a moving bed dryer by passing the particles adjacent to a heat exchanger plate containing a heated fluid while passing a dehumidified gas into the solid particles from a gas flow manifold in the heat exchanger plate.

23 Claims, 5 Drawing Sheets

MOVING BED DRYER

BACKGROUND OF THE INVENTION

1. Field of the Invention

This invention relates to drying solid particles and, more particularly, to an apparatus and method for drying solid particles such as fertilizers.

2. Description of Related Art

The manufacture of fertilizers is generally carried out by agglomeration or prilling processes in which particles such as prills or granules of the fertilizer are formed. There are numerous agglomeration and prilling processes known for the manufacture of fertilizers such as ammonium nitrate, urea, potash and phosphates. Agglomeration processes are generally carried out in paddle mixers, pug mills, rotary drums, pans or fluidized beds. Prilling processes are usually carried out in prilling vessels such as prilling towers.

In many cases the fertilizer particles formed in these processes must be dried. Traditional moving bed dryers typically rely upon a large volume of air to purge the solids bed and remove water.

However, traditional moving bed dryers have high capital and operating costs associated with air scrubbing requirements. In addition, conventional moving bed dryers are frequently complex in operation.

U.S. Pat. No. 5,167,274 discloses a method and apparatus for cooling particulate solids. This patent teaches that free-flowing solid particles are cooled in an apparatus comprising a housing containing a multiplicity of parallel, vertical, expanded heat exchanger plates having a cooling fluid therein. However, U.S. Pat. No. 5,167,274 does not disclose the drying of solid particles.

U.S. Pat. No. 3,181,488 discloses a coal drying apparatus that includes vertical hollow plates containing a heated liquid. Air chambers positioned beneath the plates discharge atmospheric air upwardly through coal particles passing between the plates to carry off water vapor. However, U.S. Pat. No. 3,181,488 does not disclose the use of dehumidified gas to dry coal particles.

There is a need for an improved moving bed dryer having reduced air scrubbing requirements, lower operating costs, reduced capital costs and simplicity of operation in drying solid particles.

SUMMARY OF THE INVENTION

The present invention provides a moving bed dryer for drying solid particles and a method of drying solid particles. The moving bed dryer of the invention includes a source of dehumidified gas and at least one heat exchanger plate. Each heat exchanger plate contains an interior fluid flow channel connecting in continuous fashion a fluid inlet and a fluid outlet. In addition, each heat exchanger plate has a gas flow manifold on one end of the plate. Optionally, one or more partial gas flow manifolds located between the ends of a heat exchanger plate can extend across the plate so as to partially constrict the interior fluid flow channel between the fluid inlet and the fluid outlet. Each gas flow manifold and partial gas flow manifold has an inlet connected to the source of dehumidified gas and an outlet consisting of at least one aperture.

In embodiments of the invention, a plurality of parallel and closely spaced heat exchanger plates can be arranged in a bank. The fluid inlet of each heat exchanger plate can be connected to a common inlet header and the fluid outlet of each heat exchanger plate can be connected to common outlet header. Similarly, the inlet of the gas flow manifold and of any partial gas flow manifold of each heat exchanger plate can be connected to a common gas flow inlet header. The bank of heat exchanger plates can be enclosed in a housing. A feed hopper can be attached to one end of the housing in communication with the spaces between the plates. A discharge hopper can be attached to the other end of the housing and in communication with the spaces between the plates. Any suitable mass flow discharge control device will suffice.

According to the present invention, a method of drying solid particles is provided in which free-flowing solid particles are dried by passing the particles adjacent to a heat exchanger plate containing a heated fluid while passing a dehumidified gas into the solid particles from a gas flow manifold and any partial gas flow manifolds in the heat exchanger plate.

In embodiments, solid particles to be dried can be fed into the feed hopper described above and can be carried between the heat exchanger plates by gravity or momentum in a continuous uninterrupted flow to ensure mass flow of the particles in the dryer over the entire cross-section of the dryer between the heat exchanger plates. Dehumidified gas passes through the apertures in the gas manifold(s) into the moving bed of the solid particles to dry the particles. The dried particles can be collected in the discharge hopper and then discharged in a controlled fashion. Drying is aided by heat transfer to the solid particles from a heated fluid in the interior fluid flow channel of each heat exchanger plate.

BRIEF DESCRIPTION OF THE DRAWINGS

The preferred embodiments of this invention will be described in detail, with reference to the following figures, wherein.

DETAILED DESCRIPTION OF THE PREFERRED EMBODIMENTS

Figure 1:
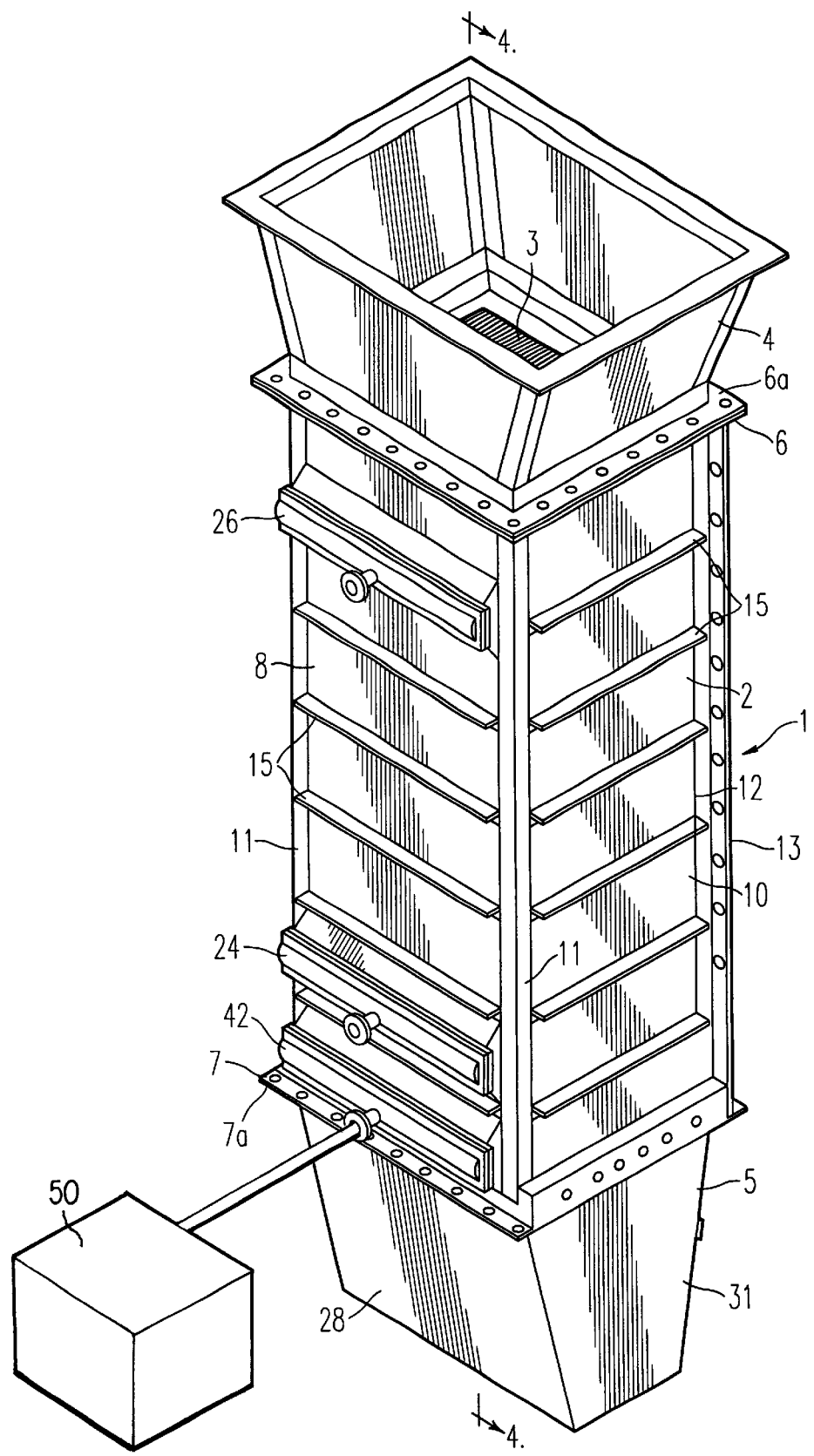
FIG. 1 is an isometric view of the dryer apparatus of the invention.

The moving bed dryer of the present invention makes novel use of conventional dryer technology. The principle difference between the present apparatus and traditional moving bed dryer technology is that heat transfer is accomplished indirectly through the use of hollow parallel plates containing a heated fluid, such as heated water. The dehumidified gas, typically air, used to purge the solids bed and thus remove water from the solids is of a much lower volume than that found in traditional moving bed dryers. While the overall heat transfer coefficient is much poorer than in a traditional fluid bed, the present invention results in less product attrition, less air scrubbing, lower operating costs, reduced capital cost and simplicity of operation.

The moving bed dryer of the present invention not only exploits the art of moving beds, but specifically introduces a carefully metered and conditioned stream of gas into the moving solids bed. The gas stream must not be introduced at a rate high enough to cause fluidization. Also, the gas velocity at the point where the gas stream enters the moving solids bed should not cause physical destruction of the particulate material.

Of critical importance to the invention is the humidity of the purge gas introduced into the moving solids bed. While energy supplied by the heating fluid within the heat exchanger plates must be sufficient to account for latent heating of the solid particles, heat of reaction or phase change which may accompany changes in the crystalline structure of the solid particles, if any, and the heat of evaporation of moisture in the solid, this heat alone will not ensure drying. Sufficient energy transfer to the solid particles, however, supplements the driving force necessary to achieve the mass transfer desired in drying. Classical mass transfer theory teaches that drying of hygroscopic porous solids in fertilizers, such as ammonium nitrate prills, occurs as unbound water is progressively vaporized below the surface of the solid. This vaporization in turn is accompanied by diffusion of water vapor through the solid at some rate $D_v$, where $D_v$ is the volumetric diffusivity of moisture through the solid. Assuming that the water to be removed from the solid particles is vaporized and the dryer unit is sized to provide sufficient residence time such that drying is not diffusion limited, drying will occur when the vapor pressure of water in the purge gas stream is exceeded by the vapor pressure of water in the solid particles. Thus, dehumidification of the purge gas is critical for creating this vapor pressure gradient necessary for mass transfer.

In embodiments of the present invention the moving bed dryer includes at least one heat exchanger plate. The heat exchanger plate includes an interior fluid flow channel connecting a fluid inlet and a fluid outlet, and includes a gas flow manifold at one end of the heat exchanger plate. An inlet of the gas flow manifold is connected to a source of dehumidified gas, such as a gas dehumidifier, and an outlet of the gas flow manifold includes at least one aperture allowing dehumidified gas inside the gas flow manifold to flow out of the gas flow manifold into solid particles in a moving bed passing adjacent to the heat exchanger plate.

In embodiments, the moving bed dryer can include a plurality of the heat exchanger plates arranged in a bank within the dryer housing. The heat exchanger plates can be horizontally spaced substantially parallel to each other. Preferably, the heat exchanger plates are substantially evenly spaced. The heat exchanger plates can have smooth exterior surfaces defining flow passages between the plates. The heat exchanger plates can be very thin, with thicknesses in a range of about 5 to 10 mm. The heat exchanger plates are preferably closely spaced for more efficient heat exchange between the plates and the solids passing between the plates. The spacing of plates is an important parameter as the distance determines the effectiveness of the heat exchange. To effect the same degree of heat exchange, a larger spacing between the plates requires a larger apparatus with a larger heat exchange surface. The most effective heat exchange is obtained when the plates are closely spaced. The spacing is in the range of about 15 to 100 mm from center to center of the plates, preferably in the range of about 15 to 30 mm from center to center. As the expanded plates can be very thin, an effective spacing of about 25 mm from center to center of the plates is most preferred.

The heat exchanger plates can be arranged so that the gas flow manifold at one end of each heat exchanger plate is below the interior fluid flow channel within the heat exchanger plate. Preferably each plate is arranged substantially vertically, with the gas flow manifold at the bottom of the plate and vertically below the interior fluid flow channel. In embodiments, the gas flow manifold on each heat exchange plate is substantially coextensive with the bottom end of the plate.

In other embodiments, a heat exchanger plate can include a partial gas flow manifold positioned between the gas flow manifold on the bottom end of the heat exchanger plate and the other opposing end of the heat exchanger plate. The partial gas flow manifold partially constricts the heated fluid flowing in the interior fluid flow channel of the heat exchanger plate, but does not block the flow of the heated fluid. In embodiments, a partial gas flow manifold that is not as thick as the heat exchanger plate can extend completely across the width of a heat exchanger plate without completely blocking the flow of the heated fluid in the interior fluid flow channel. In other embodiments, a partial heat exchanger plate extends only part way across the width of a heat exchanger plate. A plurality of such partial gas flow manifolds can be arranged along opposing sides of a heat exchanger plate.

The term gas manifold refers to one or both of the gas flow manifold and the partial gas flow manifold.

To funnel solid particles into the moving bed dryer, a feed hopper can be connected to an inlet of the housing. To direct solid particles away from the moving bed dryer a discharge hopper can be connected to an outlet of the housing.

According to the present invention, a process for drying solid particles is provided comprising passing a moving bed of solid particles adjacent to a heat exchanger plate containing a heated fluid. A dehumidified gas from a gas dehumidifier is fed to the gas manifolds of the heat exchanger plate. The heated fluid in the internal fluid flow channel of the heat exchanger plate can heat the dehumidified gas in the gas manifolds. The dehumidified gas passes from the gas manifolds into the moving bed without fluidizing the moving bed.

The heated fluid in the internal fluid flow channel of the heat exchanger plate can be a gas or a liquid. Preferably, the heated fluid is water. The heated fluid can flow through the heat exchanger plates in a direction concurrent or countercurrent to the flow of solid particles. Preferably the heated fluid flows in a direction countercurrent to the flow of solid particles.

In embodiments of the present invention, gravity causes the particulate solids in the moving bed to pass adjacent to the heat exchanger plates.

In embodiments, the dehumidified gas can flow from a source of dehumidified gas into the gas manifolds through one or through a plurality of inlets to the gas manifolds. The dehumidified gas from the gas manifolds is preferably substantially evenly distributed into the moving bed of particulate solids. In embodiments, heated dehumidified gas flows from both the gas flow manifold at the bottom of a heat exchanger plate and from partial gas manifolds between the ends of the heat exchanger plate.

Since the dehumidified gas must be placed in intimate contact with the moving bed of solid particles, it is preferable to introduce the dehumidified gas so as to evenly distribute it throughout the gas manifolds and into the solid particles. The number and spacing of the apertures in the gas manifolds are preferably chosen to ensure uniform drying throughout the moving bed of solid particles. In embodiments, apertures in the gas flow manifold and the partial gas flow manifold can be arranged on one or both sides of the gas manifolds. Apertures arranged on both sides of a manifold in a heat exchanger plate permit dehumidified gas from the manifold to dry solid particles on both sides of the heat exchanger plate. In embodiments where solid particles pass only one side of a heat exchanger plate, such as when the heat exchanger plate is arranged on the outside of a bank of plates, apertures can be arranged only on the side of the manifold that is exposed to solid particles.

The source of dehumidified gas can be, for example, a gas cylinder containing dehumidified gas. Preferably, the source of dehumidified gas is a gas dehumidifier. Gas dehumidifiers are well known in the art. The dehumidified gas can be any gas that does not react appreciably with the solid particles during the drying process. For example, the dehumidified gas can be air, nitrogen or one of the inert gases. Preferably, the dehumidified gas is dehumidified air.

The dehumidified gas can pass in concurrent flow, countercurrent flow, or cross flow through the moving bed of solid particles. Preferably the flow of the dehumidified gas is countercurrent to the flow of the solid particles.

In embodiments, the flow of particles through the dryer can be controlled to maintain the dryer in a flooded condition with respect to the particles so that maximum dryer capacity is used and mass flow conditions are maintained. The flooded condition can ensure that the particles pass through the dryer substantially without turbulence and motion that would cause appreciable shear, friction, attrition and abrasion.

The solid particles that can be dried according to the invention can contain various fertilizers. The fertilizers can include one or more of urea, ammonium nitrate, phosphates, ammonium phosphates, ammonium sulfate, potash and mixtures of these compounds.

EXAMPLE

The invention is further illustrated by the following non-limiting example.

Figure 2:
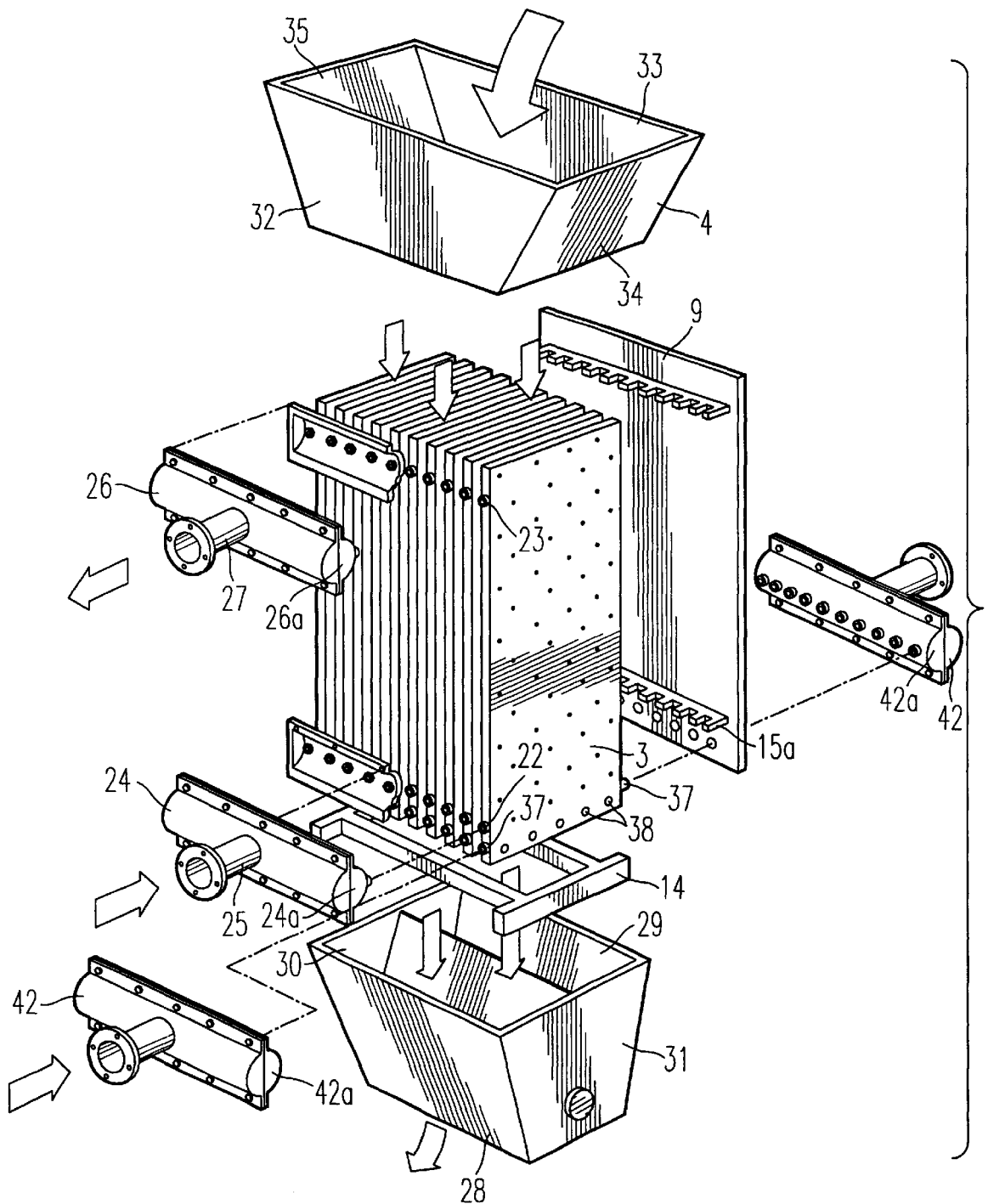
FIG. 2 is an exploded isometric view of the apparatus of the invention with the housing removed to show the heat exchanger plates.
Figure 3:
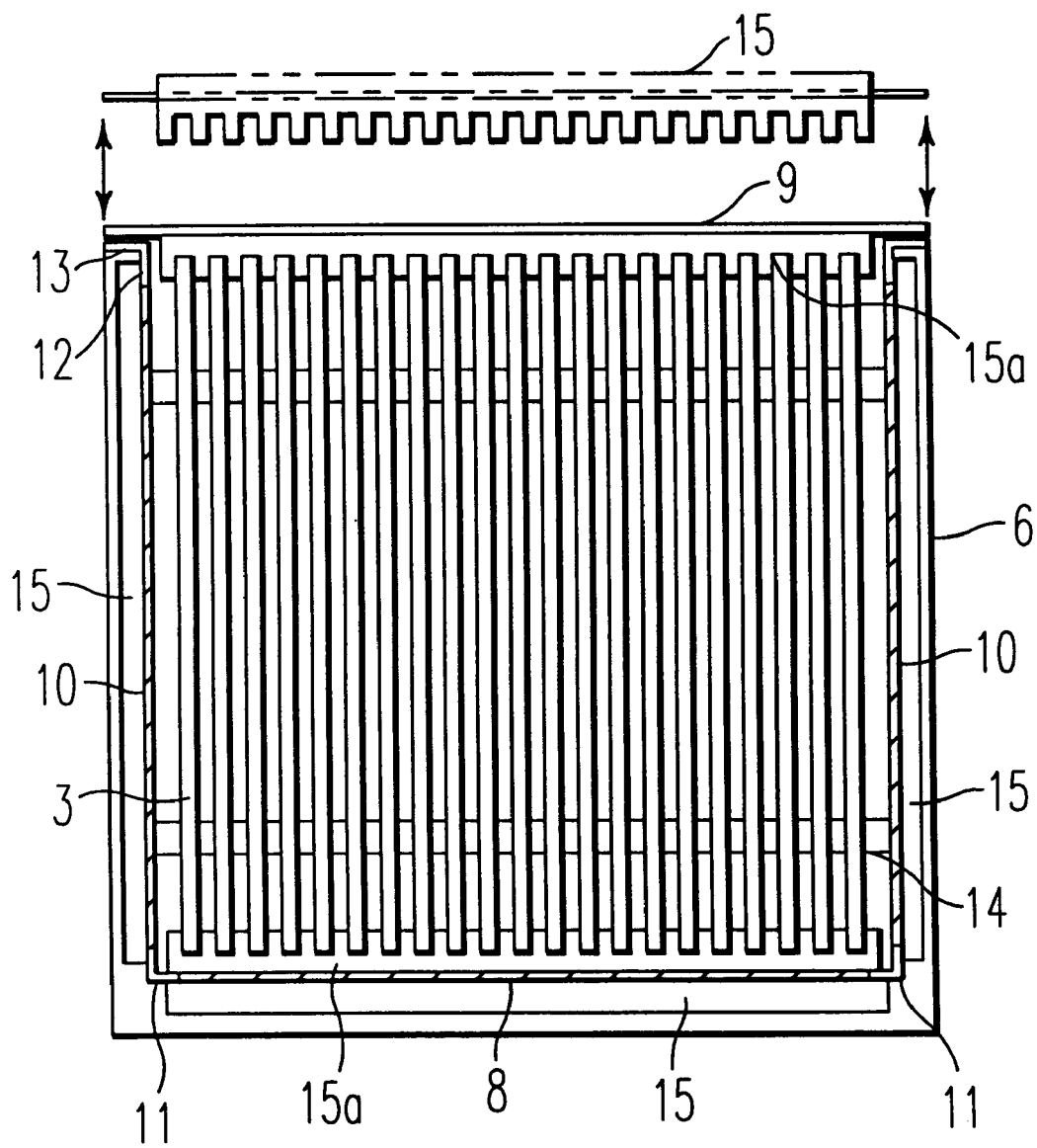
FIG. 3 is a plane view of the heat exchanger plates with removable rear panels.

In FIGS. 1, 2 and 3 a moving bed dryer, generally indicated at 1, includes a housing 2 containing a multiplicity of heat exchanger plates 3, a feed hopper 4 and a discharge hopper 5. Feed hopper 4 and discharge hopper 5 are attached at the upper and lower extremities of housing 2 and have a common center line with the housing. The dimensions of the bottom opening of feed hopper 4, of the top opening of discharge hopper 5, and of the top and bottom openings of housing 2 are the same.

The housing 2 has a generally square or rectangular cross section and comprises a front panel 8, a back panel 9 and two side panels 10. Front panel 8 is attached to and between two corner posts 11 (angle irons). Side panels 10 are each attached to and between a corner post 11 and a corner post 12 (angle iron) such that one side of a corner post 12 is perpendicular to side panels 10 and forms a flange 13 which has means for the removable attachment of back panel 9. The upper extremity of housing 2 has a horizontal circumferential flange 6 for attachment to feed hopper 4, and the lower extremity has a similar, horizontal circumferential flange 7 for attachment to discharge hopper 5, as shown in FIG. 1.

Mounted inside housing 2 is a bank of a plurality of vertically positioned, parallel, spaced, expanded heat exchanger plates 3. The bank is supported on support bars 14 that have a small horizontal cross section to provide minimum obstruction and are mounted at the lower extremity of and in housing 2. The bank of plates substantially fills housing 2 leaving only a narrow space between the bank and the panels of the housing. Sufficient space is provide between the bank and flanges 6 and 7 to allow for extraction and insertion of one or more plates from the bank after back panel 9 and headers 24, 26 and 42 (to be described) have been removed from housing 2. A source of dehumidified gas 50 is attached to header 42.

A number of support angles 15, preferably equally spaced, are attached on the outside of panels 8, 9 and 10 essentially between posts 11, between posts 12, and between post 11 and post 12, respectively. As shown in FIG. 3, the plates of the bank are evenly and closely spaced in and by notched spacing bars 15a that are welded to corner posts 11 on the inside of front panel 8 and are welded against back panel 9, in positions opposite the exterior support angles 15.

Figure 5:
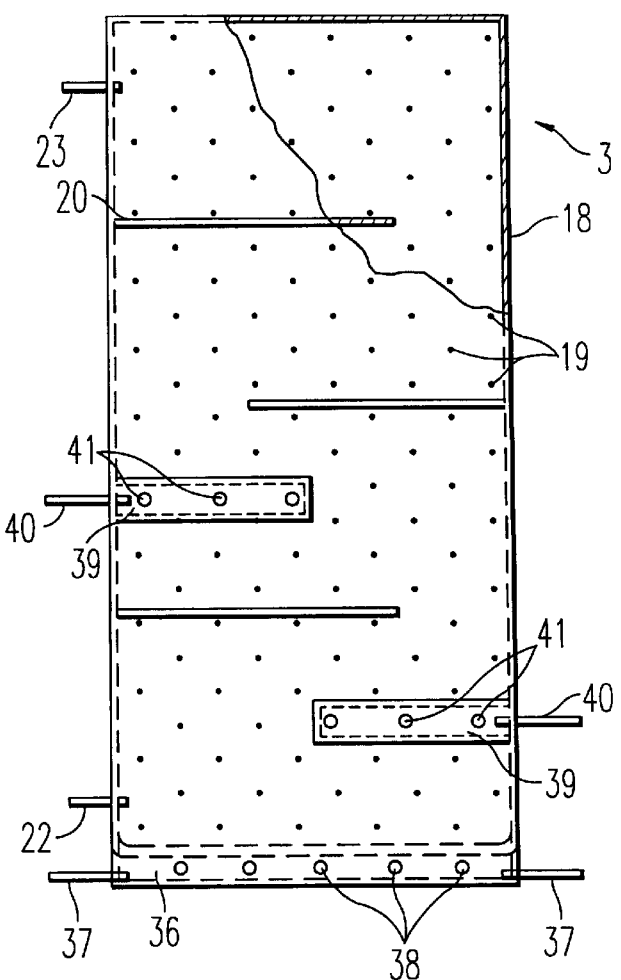
FIG. 5 shows a heat exchanger plate containing a gas flow manifold and two partial gas flow manifolds, and shows the welding pattern used to construct the plate.
Figure 6:
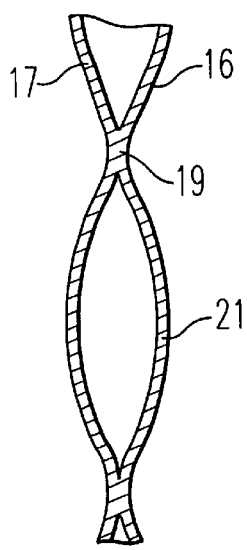
FIG. 6 is a partial section through a heat exchanger plate.

With reference to FIGS. 5 and 6, expanded heat exchanger plate 3 consists of two plates 16 and 17 that are welded together around and at their peripheries 18. Both plates 16 and 17 are also spot-welded together over their entire surface in a preferably regular pattern at a multitude of points 19, and are seam-welded at a number of lines 20, each seam weld extending partially and alternately from one side to the other side of a plate. The spaces between the spot welds at points 19 and between the spot welds and the seam welds at lines 20 are mechanically expanded, such as, for example, by hydraulic expansion to form interconnected continuous interior fluid flow channels through the pillow-like expansions 21 between spot welds and in a serpentine path defined by the seam welds of lines 20 and peripheral weld 18. Alternatively, plates 16 and 17 may be mechanically embossed prior to peripheral welding together to form the mechanically expanded heat exchanger plates 3. An inlet 22 for heated fluid is appropriately attached with one of its ends to the lower end, and an outlet 23 for heated fluid is similarly attached to the upper end of each of heat exchanger plates 3.

With reference to FIGS. 1 and 2, the heated fluid inlets 22 and the heated fluid outlets 23 pass through front panel 8 of housing 2 and are seal welded at their distal ends into openings (not shown) in the rear halves 24a and 26a of common heating fluid inlet header 24 and common heating fluid outlet header 26, respectively. Inlet header 24 and outlet header 26 are mounted on the outside of front panel 8 of housing 2 and are connected to fluid supply and discharge lines (not shown) by means of short, flanged inlet and outlet pipes 25 and 27, respectively, centrally mounted on the respective headers 24 and 26. The welded attachment of inlets 22 and outlets 23 into headers 24 and 26 allows removal of one or more plates 3 from housing 2 after headers 24 and 26 have been split open, the seal welds at the distal ends of inlets 22 and outlets 23 have been ground off, and back panel 9 has been removed from housing 2 (FIG. 3).

Similarly, in FIGS. 1 and 2 dehumidified gas inlets 37 of heat exchanger plates 3 pass through panels 8 and 9 of housing 2 and are seal welded at their distal ends into openings (not shown) in the rear halves 42a of common dehumidified gas inlet headers 42. Headers 42 are connected to a source of dehumidified gas (not shown). Headers 42 can be removed from the heat exchanger plates 3 in the same manner as headers 24 and 26.

The heat exchanger plate 3 includes a gas flow manifold 36 at the bottom end of the plate (FIG. 5). The inside of gas flow manifold 36 is not connected to the interconnected interior fluid flow channel inside the pillow-like expansions 21. As shown in FIGS. 2 and 5, gas flow manifold 36 includes dehumidified gas inlets 37 and gas outlet apertures 38. Apertures 38 are evenly spaced along both sides of manifold 36.

Optionally, as shown in FIG. 5, heat exchanger plate 3 can include partial gas flow manifolds 39 extending part way across the width of heat exchanger plate 3. The passage inside each partial gas flow manifold is not connected to the interconnected interior fluid flow channel inside the pillow-like expansions 21. Each partial gas flow manifold 39 includes a dehumidified gas inlet 40. Gas inlets 40 can be connected (not shown), along with gas inlets 37, to a common dehumidified gas inlet header 42 in a variety of ways well known to the skilled artisan. Dehumidified gas outlet apertures 41 are arranged along the sides of each partial gas flow manifold 39.

Feed hopper 4 (see FIGS. 1 and 2) has vertically positioned trapezoid-shaped front and rear panels 32 and 33, respectively, and sloping side panels 34 and 35. Feed hopper 4 is open at its top and bottom and is made of angle irons at all of its sides with panels 32, 33, 34 and 35 attached to the angle irons. The angle irons at the lower end of hopper 4 form a circumferential flange 6a that matches flange 6 of housing 2 for attachment thereto. The slope of the side panels 34 and 35 of the feed hopper is greater than the angle of repose of the particles such that particles can be easily fed into feed hopper 4.

Discharge hopper 5 (see FIGS. 1 and 2) is open at its top and bottom and has a cross section of an inverted, truncated isosceles triangle in the direction parallel to heat exchanger plates 3. The top of discharge hopper 5 is provided with a circumferential flange 7a that matches flange 7 of housing 2 for attachment thereto. Discharge hopper has two sloping side walls 28 and 29 and two opposite, parallel, vertical end walls 30 and 31.

In the method according to the invention, substantially free flowing particles are fed into the feed hopper 4 of dryer 1. The particles can be any solid particles that require drying and have characteristics that will allow the particles to descend from feed hopper 4 to the discharge hopper 5 past and between the expanded heat exchanger plates 3 positioned in housing 2. For proper operation of the dryer, the particles to be dried should be substantially free-flowing and should have a moisture content that does not interfere with the free flow of particles through the dryer. If necessary, the particles may be subjected to drying prior to entry in the dryer.

Figure 4:
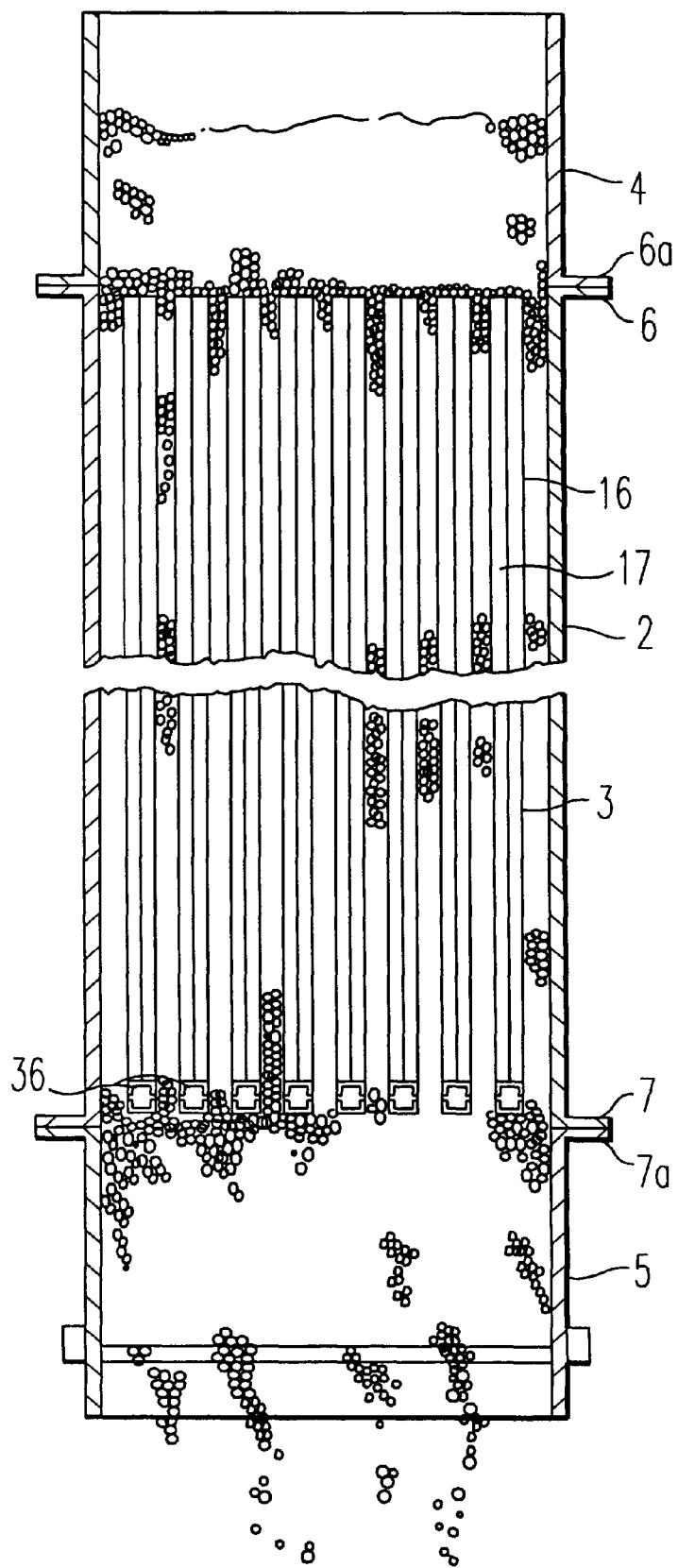
FIG. 4 is a vertical section taken along line 4.—4. of FIG. 1 and showing the bottom hopper in elevation partly cut away.

When feeding particles into feed hopper 4, the material is preferably evenly distributed over the entire cross section of the housing so that the dryer is operated in a flooded state, as shown in FIG. 4. The particles flow in mass flow by gravity past and between the heat exchanger plates 3 and are dried during their passage between the plates. A suitable heated fluid is fed from a source through inlet pipe 25 into common header 24 wherein the fluid is distributed to the inlets 22 of the plates. The flow of heated fluid is substantially countercurrent to the direction of flow of the particles. The fluid flows through the multitude of flow channels of the interconnected pillow-like expansions 21 in a serpentine way defined by seam welds 20 to the outlets 23 and is discharged via common header 26 and outlet pipe 27 to a fluid discharge line. Dehumidifed gas passes through apertures 38 in manifold 36 into the particulate solids to dry the particles.

It is noted that the outside surfaces of the heat exchanger plates are substantially smooth to prevent any hang-up of the particles as they move past it.

The particles pass by gravity in a continuous uninterrupted flow from the feed hopper between the heat exchanger plates and into the bins of the discharge hopper 5 from which they are discharged at a controlled rate.

The apparatus of the invention is substantially free of obstructions, means or features that would cause either an interruption in the mass flow of particles or cause shear forces, friction, turbulence or mixing in the flow of particles that would result in breakdown, attrition or abrasion of the particles.

While the present invention has been described with reference to specific embodiments, it is not confined to the specific details set forth, but is intended to convey such modifications or changes as may come within the skill in the art.

What is claimed is:

1. A moving bed dryer comprising
    a source of dehumidified gas, and
    at least one heat exchanger plate, wherein
    the at least one heat exchanger plate includes
        an interior fluid flow channel connecting a fluid inlet and a fluid outlet, and
        a gas flow manifold on an end of the at least one heat exchanger plate;
    an inlet of the gas flow manifold is connected to the source of dehumidified gas;
    an outlet of the gas flow manifold comprises at least one aperture;
    the at least one heat exchanger plate comprises two largest surfaces;
    the two largest surfaces are on opposite sides of a plane;
    the at least one aperture has an axis; and
    the axis is not parallel to the plane.

2. The moving bed dryer according to claim 1, wherein the source of dehumidified gas is a gas dehumidifier.

3. The moving bed dryer according to claim 1, wherein the outlet of the gas flow manifold comprises at least two apertures arranged on opposing sides of the gas flow manifold.

4. The moving bed dryer according to claim 1, wherein the gas flow manifold is substantially coextensive with the end of the at least one heat exchanger plate.

5. The moving bed dryer according to claim 1, further comprising at least one partial gas flow manifold positioned between the gas flow manifold on the end of the at least one heat exchanger plate and an opposing end of the at least one heat exchanger plate, wherein
    an inlet of the at least one partial gas manifold is connected to the source of dehumidified gas;
    an outlet of the at least one partial gas manifold comprises at least one aperture; and
    the at least one partial gas flow manifold partially constricts the interior fluid flow channel.

6. The moving bed dryer according to claim 5, wherein the at least one partial gas flow manifold extends partially across a width of the at least one heat exchanger plate.

7. The moving bed dryer according to claim 6, wherein
    the at least one partial gas flow manifold is at least two partial gas flow manifolds; and
    the at least two partial gas flow manifolds are positioned along opposing sides of the at least one heat exchanger plate.

8. The moving bed dryer according to claim 1, wherein the at least one heat exchanger plate is positioned so that the gas flow manifold is below the interior fluid flow channel.

9. The moving bed dryer according to claim 8, wherein the gas flow manifold is vertically below the interior fluid flow channel.

10. The moving bed dryer according to claim 1, wherein
the at least one heat exchanger plate is at least three heat exchanger plates; and
the at least three heat exchanger plates are horizontally spaced substantially parallel to each other.

11. The moving bed dryer according to claim 10, wherein the at least three heat exchanger plates are substantially evenly spaced.

12. The moving bed dryer according to claim 1, further comprising
a housing containing the at least one heat exchanger plate,
a feed hopper connected to an inlet of the housing, and
a discharge hopper connected to an outlet of the housing.

13. A process for drying solid particles, the process comprising
providing the moving bed dryer of claim 1;
passing a moving bed of solid particles adjacent to the at least one heat exchanger plate, the interior fluid flow channel containing a heated fluid, and the at least one gas flow manifold containing the dehumidified gas;
passing the dehumidified gas through the at least one aperture in the gas flow manifold into the moving bed without fluidizing the moving bed; and
drying the solid particles.

14. The process according to claim 13, wherein gravity causes the moving bed to pass adjacent to the at least one heat exchanger plate.

15. The process according to claim 13, wherein the heated fluid is a liquid.

16. The process according to claim 13, wherein the dehumidified gas is substantially evenly distributed into the moving bed from the at least one aperture.

17. The process according to claim 13, wherein the dehumidified gas flows countercurrent to the moving bed.

18. The process according to claim 13, wherein the gas is air.

19. The process according to claim 13, wherein the solid particles comprise fertilizer.

20. The process according to claim 19, wherein the fertilizer is selected from a group consisting of urea, ammonium nitrate, phosphates, ammonium phosphates, ammonium sulfate, potash and mixtures thereof.

21. The moving bed dryer according to claim 1, wherein the end of the at least one heat exchanger plate is a bottom end of the at least one heat exchanger plate.

22. The moving bed dryer according to claim 1, wherein the axis is perpendicular to the plane.

23. A moving bed dryer comprising
a source of dehumidified gas, and
at least one heat exchanger plate, wherein
the at least one heat exchanger plate includes
an interior fluid flow channel connecting a fluid inlet and a fluid outlet, and
a gas flow manifold on an end of the at least one heat exchanger plate;
an inlet of the gas flow manifold is connected to the source of dehumidified gas;
an outlet of the gas flow manifold comprises at least one aperture;
the at least one heat exchanger plate comprises two largest surfaces;
the at least one aperture has an axis; and
the axis is perpendicular to at least a portion of the two largest surfaces.

* * * * *

UNITED STATES PATENT AND TRADEMARK OFFICE
CERTIFICATE OF CORRECTION

PATENT NO. : 6,328,099 B1
DATED : December 11, 2001
INVENTOR(S) : George Allen Hilt et al.

It is certified that error appears in the above-identified patent and that said Letters Patent is hereby corrected as shown below:

<u>Column 5,</u>
Line 67, "provide" should read -- provided --

Signed and Sealed this

Sixteenth Day of April, 2002

Attest:

JAMES E. ROGAN
Attesting Officer     Director of the United States Patent and Trademark Office